United States Patent [19]
Schwartz

[11] 3,956,688
[45] May 11, 1976

[54] REMOTE CONTROL PHASE SHIFT CIRCUIT FOR THYRISTOR

[75] Inventor: Osten Schwartz, Varmdo, Sweden

[73] Assignee: Aktiebolaget Electrolux, Stockholm, Sweden

[22] Filed: Oct. 23, 1974

[21] Appl. No.: 517,045

Related U.S. Application Data
[62] Division of Ser. No. 315,438, Dec. 5, 1972, Pat. No. 3,855,665.

[52] U.S. Cl. ............................ 323/24; 307/252 B; 307/252 N; 323/36; 318/227; 318/345
[51] Int. Cl.² ............................................ H02P 3/00
[58] Field of Search .................... 323/24, 34–37, 323/22 SC; 318/227, 293, 345, 416; 307/252 B, 252 N

[56] References Cited
UNITED STATES PATENTS

| | | | |
|---|---|---|---|
| 3,323,017 | 5/1967 | Powell et al. ..................... | 323/22 SC |
| 3,417,320 | 12/1968 | Muskovac ........................... | 323/36 |
| 3,512,077 | 5/1970 | Evalds ................................. | 323/37 |
| 3,524,078 | 8/1970 | Harris, Jr. ............................. | 323/24 |
| 3,535,615 | 10/1970 | Howell et al. ........................ | 323/36 |
| 3,579,706 | 5/1971 | Hetland ............................... | 323/36 |
| 3,857,076 | 12/1974 | Hetland ............................ | 307/252 B |

OTHER PUBLICATIONS
"Using the Triac for Control of AC Power" by J. H. Galloway, G. E. Pub. Mar. 1966, pp. 4–9.

*Primary Examiner*—Gerald Goldberg
*Attorney, Agent, or Firm*—Alfred E. Miller

[57] ABSTRACT

A control circuit for a motor includes a thyristor connected to apply current to the motor, and a phase shift circuit for controlling the thyristor including a series RC circuit connected in parallel with the thyristor. The junction of the resistor and capacitor is connected to the control electrode of the thyristor. A transformer has a primary winding connected in parallel with the capacitor, and a variable resistor, which may be remotely located, connected in series with the secondary winding, for varying the phase shift of the phase shift circuit.

7 Claims, 3 Drawing Figures

REMOTE CONTROL PHASE SHIFT CIRCUIT FOR THYRISTOR

The present application is a divisional application of my co-pending U.S. application, Ser. No. 315,438, filed Dec. 15, 1972 and entitled "Remote Control For Vacuum Cleaner Motor", U.S. Pat. No. 3,855,665.

BACKGROUND OF THE INVENTION

It is considered highly appropriate in household appliances or other electrical apparatus to provide a power input to the appliance or device which can be controlled at a distance from the appliance or the like. In a vacuum cleaner with a suction conduit, for example, it would be desirable to provide both a means for selectively connecting and disconnecting the power source to the motor as well as controlling the motor speed at a location where the hose or tubular shaft of the vacuum cleaner is gripped by the user.

Although a remote motor control for a vacuum cleaner is extremely beneficial, it is difficult to arrange in practice since wires comprising house current would have to be led from the operating member located adjacent to the wand for the cleaning nozzle along the elongated hose or tubular shaft to the vacuum cleaner housing. The hose or tubular shaft would further have to provide special mounting means for the high voltage electrical conductors which would satisfy the requirements of the government safety regulations. Therefore, the most suitable vacuum cleaner remote control would be a low voltage arrangement. However, the prior art constructions have not produced a reliable, inexpensive construction for use with vacuum cleaners.

The present invention relates to a remote control structure for a vacuum cleaner motor or the like which is located in the proximity of the gripping parts of the vacuum cleaner.

It is an object of the present invention to provide a low voltage remote control arrangement for a vacuum cleaner motor located near the gripping portion of the device which is both simple in construction and inexpensive to fabricate.

Another object of the present invention is to provide a thyristor device and a phase shifting network controlling the power input to the motor.

The invention will now be more fully described with reference to the accompanying drawings in which.

DESCRIPTION OF THE PREFERRED EMBODIMENT OF THE INVENTION

Figure 1:
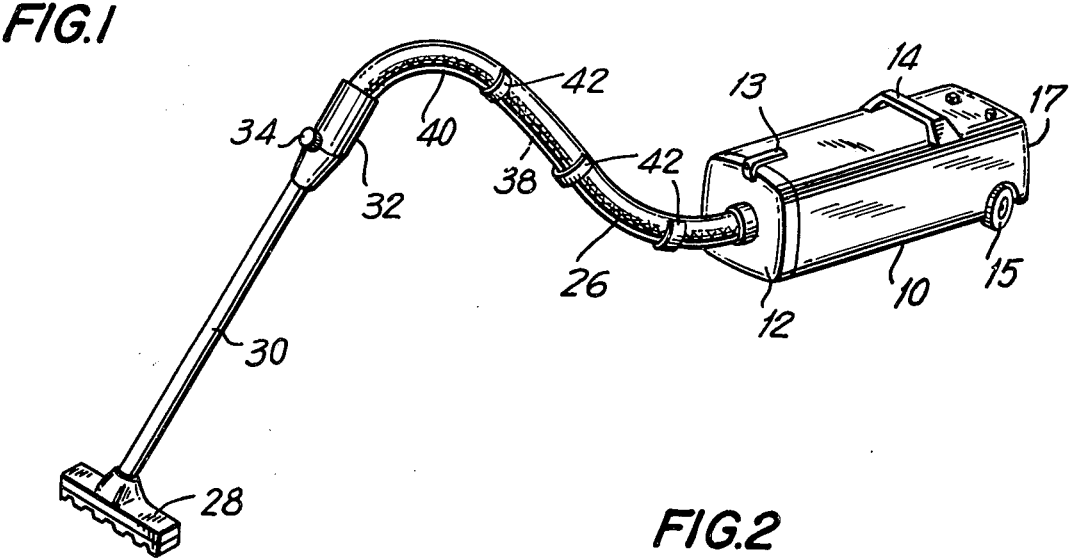
FIG. 1 is a perspective view of the vacuum cleaner embodying the remote control device for the motor operation and speed.
Figure 3:
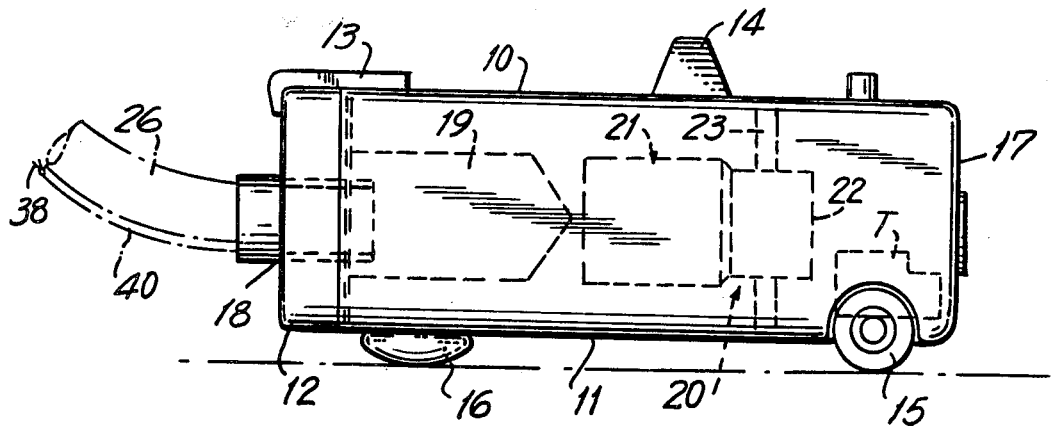
FIG. 3 is an enlarged side elevational view of the vacuum cleaner tank.

Referring to FIGS. 1 and 3 of the drawings, the invention is shown in connection with a horizontal type vacuum cleaner 10. It should be understood that it is within the scope of the present invention to utilize the instant arrangement with other vacuum cleaner configurations as well as other household appliances. The vacuum cleaner 10 is provided with a housing section 11 having a front end removable cover 12 and a latch 13. The housing section 11 is also provided with a handle 14. In addition, the housing is provided with a set of rear wheels 15 and a front glider 16 for facilitating movement of the vacuum cleaner housing on the floor or other supporting surface. An outlet opening 17 is illustrated in the rear of the housing section 11. The front end cover 12 is provided with a inlet opening 18 through which dust-laden air flows into the housing 11. A dust container or bag 19 is removably affixed to the inlet opening 18 in the front end cover 12 and functions to separate dirt from air.

The flow of air through the housing section 11 is caused by a motor and fan unit 20 in which a centrifugal fan 21 is arranged at one end of the electric motor 22. The latter is preferably resiliently mounted at 23 in any suitable manner. In the normal operation of the motor and fan unit, the fan 21 receives air which has passed through the dust bag 19 and is substantially free of dust and dirt. The air is discharged from the fan 21 through the motor 22 and finally passes through the rear outlet opening 17 of the housing section 11.

As seen in FIG. 1, a flexible suction hose 26 is removably connected at one end to the inlet opening 18 of the housing section 11. Suitable cleaning appliances such as a nozzle 28 may be connected to a tube or wand 30 which in turn is connected to the outer free end of hose 26. The tube 30 may be constituted of several interconnected sections in which the overall length of the tube can be selectively increased or diminished.

The end of the hose 26 that is remote from the vacuum cleaner 10 is provided with a coupling to the tube 30 which also functions as a grip 32 for manipulating the vacuum cleaner hose 26, and its associated tube 30. As seen in FIGS. 1 and 3, a rotatable knob 34 is shown mounted on the exterior of the grip 32 and easily reached by a person handling the grip. The knob is operatively connected to a variable resistor 36 housed internally in the grip 32. The electrical conductors 38 are encased in an insulated sheath 40 and have a series of insulated mountings 42 positioned at intervals along the hose 26. The conductors 38 connect the variable resistor 36 to the circuit T shown in FIGS. 2 and 3.

Figure 2:
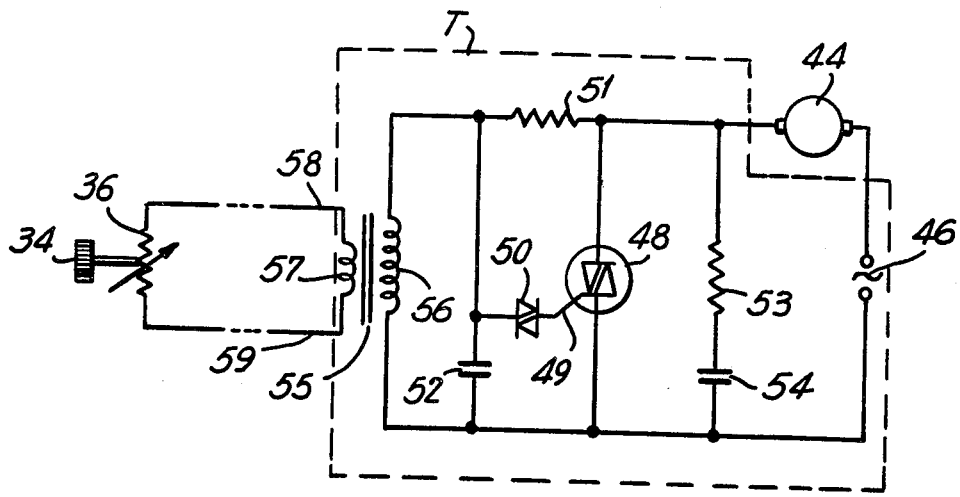
FIG. 2 is a circuit diagram of the arrangement constructed in accordance with the teachings of the present invention.

As seen in the circuit diagram of FIG. 2, a vacuum cleaner motor 44 has power supplied to it from an alternating current source 46 through a symmetric thyristor 48, which is also known as a triac. The control electrode or gate 49 of the thyristor 48 is connected to a diac 50, which is a bi-directional symmetric diode, which in turn is coupled to a phase-shifting network including a resistor 51 and a capacitor 52.

Since the motor 16 is an inductive load, a compensating network comprising a resistor 53 and a capacitor 54 is included in the circuit.

A step-down transformer 55 is shown connected in the circuit in which the primary winding 56 is coupled to the phase-shifting network comprising a resistor 51 and a capacitor 52. The conductors 38, which are low voltage conductors hereinbefore referred to, couple the secondary winding 57 of the transformer 55 to the variable resistor 36. The latter is in turn connected to the operating knob 34 on the grip 32. It should be noted that the number of turns of the secondary winding 57 is such that the magnitude of the voltage in the low voltage circuit 57, 38, 36 is maintained at a continuously low value.

If the resistance of the resistor 36 is varied, a change of impedance at the primary side of the transfmorer 55 is effected. Thus, the primary winding 56 will function as a variable impedance coupled to the phase-shifting network that controls the firing times of the thyristor 48, and by variation of resistance of the variable resistor 36, the phase shift in the network 51, 52, and 56 can be changed. This change causes the firing times of the thyristor 48 and the power supplied to the motor 44 to be changed.

The primary winding 56 of the transformer 55 is coupled to the phase-shifting network in such a manner that the impedance of the primary winding 56 will be connected in parallel with the capacitor 52. A desirable result of this parallel circuit is an advantageous curve shape of the control pulses of the thyristor 48.

It should be readily apparent that when the present vacuum cleaner is in use, the speed of the vacuum cleaner motor and hence the suction capability of the apparatus can be regulated easily by the rotatable knob 34 mounted on the grip 32. Furthermore, the motor 44 can be started and stopped by means of the knob 34. The present construction is a great convenience to the user in that it is not required to bend toward the vacuum cleaner housing 11 each time in order to regulate or stop - start the apparatus.

The present invention provided an extremely simple but reliable arrangement for control of motor speed by low voltage. Furthermore, the operating circuit of the apparatus can also be a very simple design while still fulfulling the safety requirements prescribed by law.

What is claimed is:

1. A remote control system for a device having a motor and input terminals adapted to be connected to a source of AC electrical energy; comprising a thyristor, said thyristor having a control electrode, means connecting said motor to said terminals by way of said thyristor for energizing said motor, a phase shifting network comprising a parallel circuit of a capacitor and a first impedance, and second impedance connected in series with said parallel circuit, means connecting said network in parallel with said thyristor, and means connecting the junction of said parallel circuit and said second impedance to said control electrode, said first impedance comprising a transformer having a primary winding connected in parallel with said capacitor, and a secondary winding, and a variable resistor connected in series with said secondary winding whereby variation of said variable resistor varies the impedance at a primary winding of said transformer.

2. The system of claim 1 wherein said second impedance is a resistor.

3. The system of claim 2 wherein said thyristor is a triac.

4. The system of claim 3 wherein said means connecting the junction of said parallel circuit to said control electrode comprises a diac.

5. The system of claim 2 in which said motor acts as an inductive load, further comprising a compensating network connected to said system.

6. The system of claim 5 wherein said compensating network comprises a series circuit of a resistor and capacitor connected in parallel with said thyristor.

7. The system of claim 1 wherein said variable resistor comprises a remote control device comprising remote control leads interconnecting said variable resistor with said secondary winding.

* * * * *